July 4, 1967 D. B. KOEPKE 3,329,435

RECORD PLAYER SPINDLE ADAPTER

Filed Sept. 24, 1964

INVENTOR.
DONALD B. KOEPKE
BY Watson D. Harbaugh
ATT'Y.

3,329,435

RECORD PLAYER SPINDLE ADAPTER

Donald B. Koepke, Franklin Park, Ill., assignor to Webcor, Inc., a corporation of Illinois Filed Sept. 24, 1964, Ser. No. 398,803
5 Claims. (Cl. 274—10)

Figures 1, 2, 3:
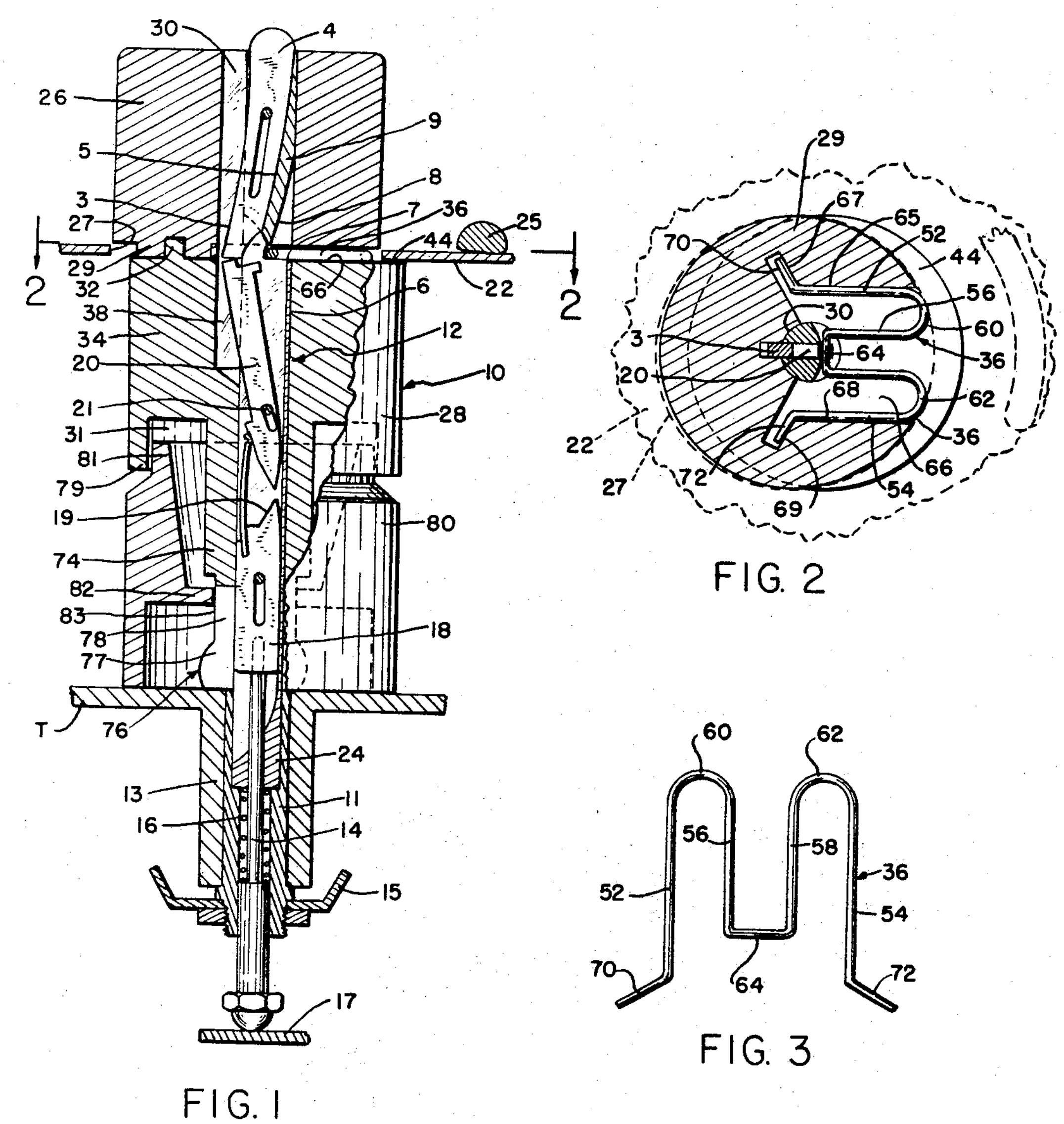

This invention relates to a readily detachable adapter spindle arrangement for an automatic phonograph record changer to accommodate phonograph records having different size center holes and more particularly to an improved release mechanism for such an adapter spindle for successively feeding to a turntable the lowermost record from a stack of records having a large center hole size supported above the turntable.

Automatic record changers are generally equipped with a small diameter stationary spindle at the center of a turntable both to support a stack of records well above the turntable to clear the tone arm and to release and guide each successive lowermost record one by one into properly centered playing position on the turntable. Along with this, an over arm resting on top of the stack provides automatic functions. Since all records do not have the same size central hole, spindles of different sizes corresponding to the size of the record hole must be used to center the record. It is desirable that such an adapter be quickly and easily attachable and removable so that a single turntable can readily be adapted for use with records of different sizes. Such an adapter spindle arrangement is shown in the Dale Patent No. 2,666,648, reference to which is hereby made.

As shown in the Dale patent, the best known and most commonly used spindle arrangement comprises a stationary shaft having a diameter that will guide records having the smallest popular size central hole of approximately 0.281 inch diameter. The shaft generally has two distinct portions delineated by a notch between them on one side that defines a small horizontal crescent-shaped shoulder. The upper portion functions as a pilot or guide on which a group of records can be stacked so that they rest on the shoulder and the lower portion or body of the spindle supports the stack and guides the records as they drop one by one to the turntable. A push-off mechanism located within the spindle at the shoulder is employed to push from the shoulder into concentricity with the lower body portion the lowermost record stacked on the pilot portion so that it will drop into playing position on the turntable at the start of each playing cycle.

Another common record hole size is one having a 1½ inch diameter. Records having this size opening are usually short playing records because of price or specially recorded material and it is highly desirable to have them handled automatically because of the rapid recurrence of their playing cycles. Thus, it is necessary to provide a means whereby spindle sizes can be quickly and easily converted for full automatic operation of all records by persons of all ages and aptitudes.

Various methods have been employed for converting the size of the spindle as desired including removing the smaller spindle and replacing it with a larger spindle whose push-off mechanism is controlled by the same sub-panel controls as the small spindle. Another method is to provide an adapter spindle that is mounted on the smaller spindle with the adapter utilizing the push-off means of the smaller spindle to control a record release means within the adapter. Thies latter is the approach followed by the present invention.

Whether the smaller spindle is replaced with a larger one or the adapter spindle is mounted on the smaller one, the larger spindle must provide a means whereby the lowermost record may be dropped singly to the turntable while the spindle is supporting the remaining stack of records. Heretofore, this is generally done by providing a cylindrical spindle having two sets of retractable shelves with the shelves of each set being diametrically opposed on the cylinder and the shelves of the different sets being vertically spaced from each other a short distance equal to the thickness of one record. In the normal position the lowermost set of shelves extends from the wall of the cylinder and supports the record stack while the upper set is retracted within the cylinder. As the record release is activated by mechanical linkage, the upper shelves are forced out to support all the records on the stack above the lowermost one resting on the lower shelves, and the lower shelves are retracted within the cylinder to thereby release and drop the lowermost record to playing position on the turntable. The shelves and driving linkages for the above mentioned larger spindle are quite costly and complicated because of the necessity of numerous small parts requiring tolerances in their production and the added expense of assembly and servicing. Furthermore, such may not take advantage of other automatic functions available with a phonograph such as record repeat and shut-off, etc.

Thus, it is an object of this invention to provide a readily managed spindle for the larger diameter hole record that has only one moving die-formed working part in its record release mechanism which is readily assembled and removed for replacement, if desired, as mounted in a single integrated die-cast unit whereby tolerances and performance possible with die work are closely held and controlled.

It is another object of this invention to provide an improved unitized adapter spindle having only three readily assembled parts, namely, an integrated body, an ejector element and a record guide member rotatable with the turntable, which unit can be mounted on a stationary smaller spindle to provide an increased spindle size for handling records having a large central hole.

A further object of this invention is to provide an adapter spindle receivable on a smaller spindle whose record drop and push-off mechanism is controlled by the record player mechanism associated with the smaller spindle including the speed control, proper tone arm indexing, record reject, record drop, and last record repeat or shut-off, as more particularly disclosed in the Bara Patent No. 3,033,576, reference to which is hereby made.

A still further object is to provide an adapter spindle that can be quickly and easily mounted or detached from a well-known smaller spindle and serviced by those unskilled mechanically without need for employing any tools.

These and further objects of the invention will become more apparent from the following description, the drawing related thereto and the appended claims.

In the drawing:

FIG. 1 is an elevational partially cross-sectional view of the adapter spindle mounted on the smaller spindle illustrating the preferred embodiment of the invention, FIG. 2 is a plan view taken sectionally upon line 2—2 of FIG. 1, FIG. 3 is a plan view of the die-formed push-off element for record drop which can be made of either cross-sectionally square or round spring wire.

Referring to the assembly shown in FIG. 1, a large adapter spindle 10 is shown as mounted on a small spindle 12. The upper pilot portion 9 of the spindle 12 is notched out at 8 to provide an upwardly facing shoulder 7 on the upper end of a lower end portion 6. A longitudinal kerf 5 in the upper portion slidably receives a vertically movable pawl 4 which in its lower position provides an outwardly exposed and inclined blade and edge portion 3 which urges small hole records on the upper portion to come to rest on the shoulder 7.

The lower end portion 24 of the spindle 12 is secured in a tubular bearing 11 which journals the depending hub 13 of a turntable T as weight supported upon a phonograph frame member 15. A push rod 14 reciprocably mounted in the lower end of the rod is retracted downwardly by a spring 16 under compression and is moved upwardly to make a record drop in timed relationship by a phonograph controlled actuator 17.

The push rod 14 carries a slide 18 having a cam surface 19 thereon which raises a push-off lever 20 endwise a short distance to carry its upper end above the level of the shoulder 7 and then drives the upper end to pivot about the pin 21 to move across the shoulder 7. This movement of the upper end would push the lowermost small hole record off of the shoulder if such a record were present there.

The adapter spindle 10 comprises two cylindrical portions 26 and 28 of a diameter which receives the large center hole 27 of a record 22. The upper cylindrical portion 26 has a vertical key hole shaped opening 30 disposed off center thereto throughout its entire length which snugly engages over the upper pilot portion 9 and the pawl 4 of the small spindle 12. The pawl edge portion 3 engages in the wing portion of the keyhole opening and supports the upper portion against rotation.

The lower cylindrical portion 28 has a hollow core 31 throughout a portion of its height terminating at its upper end in a solid head portion 34 containing a concentric opening 38 shaped to accommodate the lower portion 23 of the stationary spindle 12 along with the push-off lever 20 without binding. The axes of the openings 30 and 38 are concentric with respect to the upper and lower spindle portions 9 and 23, respectively, and this concentricity eccentrically offsets the cylindrical portions 26 and 28 with respect to each other to provide a crescent-shaped shoulder at 44 (FIG. 2).

The amount of off-set is approximately the same or a little less than the radial width of the shoulder 7 on the stationary spindle 12. The shoulder 44 supports the lowermost record 22 received on the upper portion 26 as held level by a steady rest element resting on the top of the uppermost record. The upper portion 26 is integrated in this position with the lower portion 28, preferably by cement bonding at the interfaces, as located by appropriate mating pin and socket elements 32. This eliminates screws and rivets because as will be presently seen, the cylindrical portions do not have to be separated to assemble or service the other elements unitized therewith. These will now be considered.

Still referring to FIG. 1, the push-off lever 20 of the inner spindle 12 is shown in its normal retracted position and it is seen that the upper portion 26 and lower portion 28 are separated by a sectionally ellipsoidal spacer portion 29 having the thickness of a record 22 that is being handled, and in this spacer portion a record push-off element 36 is housed where it is acted upon by the push-off lever 20 in the spindle 12.

Referring now to FIG. 2, the push-off element 36 is shown as theoretically positioned on a flat top of the lower cylindrical portion 28 for convenience of description where it moves back and forth across the face of the shoulder 44. The push-off element 36 comprises a small gauge spring steel wire member die-formed in the shape shown of a block style W having two parallel outer legs 52 and 54 and two parallel inner legs 56 and 58. Preferably the wire is square sectionally, but may be circular, and is of a thickness equal to the thickness of the record 22. The two outer legs 52 and 54 terminate at their ends in diverging leg portions 70 and 72 each disposed at an angle of approximately 75° to parallel portions of the legs 52 and 54. The outer legs 52 and 54 are connected to one end of the adjacent inner legs 56 and 58 by semicircular portions 60 and 62 and the two parallel inner legs 56 and 58 are interconnected by a semicircular portion 64 at their other end.

The push-off element 36 is held in a predetermined position on the top of the head portion 34 of the lower cylindrical portion 28 by side wall portions 65 and 68 in a cavity 66 receiving the diverging legs 70 and 72 in the spacer portion 38. The recess portions have diverging wall portions 67 and 69 engaged by the legs 70 and 72 and the legs 70 and 72 are cammed thereby toward each other when the legs 52 and 54 are moved endwise outwardly over the shoulder 44. Otherwise, adequate space and clearance is afforded around the legs 52 and 54 for their flexure and work activity during a radial rectilineal movement of the legs 56 and 58 that is guided by side walls 65 and 68. With this arrangement the element 36 can be assembled and withdrawn for servicing anytime across the shoulder 44 but when in operative position the camming action at walls 67 and 69 permits adequate movement of the element by the lever 20 for record drop yet reversely retracts the element 36 when the lever 20 is released.

The portion 64 connecting the two inner legs 56 and 58 of the element 36 rests on the shoulder 7 of the inner spindle 12 and the rounded portions 60 and 62 connecting the outer legs 52 and 54 to the adjacent inner legs 56 and 58 are disposed directly behind the outer circumference of the upper cylinder 26 adjacent to the shoulder 44 on the lower cylinder 28 so that the legs 52 and 54 when extended in the direction of the shoulder 44 will move the portions 60 and 62 outwardly across the shoulder 44.

The push-off element 36 is operated in the following manner. The push-off lever 20 of the inner spindle 12 is raised and pivoted by the raising of the slide 18 by actuator 17. With this movement the top of the lever 20 engages the portion 64 of the element 36 and through it drives the inner legs 56 and 58 of the push-off 36 outwardly onto the shoulder, the rounded portions 60 and 62 of the push-off spring 36 move across the shoulder 44 of the adapter 10 and end flush with the outer circumference of the lower cylinder 28 of the adapter 10. The rounded portions 70 and 72 in their movement force the record 22 into concentricity with the lower cylindrical portion 28 and it drops to the turntable T. As this occurs the cams 67 and 69 spring the outer legs 52 and 54 toward each other.

Then when the push-off lever 20 of the inner spindle 12 is retracted to its normal position, the springing action of the two outer legs 52 and 54 against the cams 67 and 69 urge the extended ends 70 and 72 back along the cams 67 and 69 by a camming action upon the extended ends 70 and 72. In this manner the push-off spring 36 follows the action of the push-off lever 20 of the inner spindle 12 and retracts from the shoulder 44 whereupon the record stack held by the upper cylindrical portion 26 settles to rest on the shoulder 44.

Referring again to FIG. 1, the head portion 34 of the lower portion 28 centrally has a boss or sleeve portion 74 snugly telescoping over the spindle 12. It serves as a spacer support for the shoulder 44 above the turntable and terminates in an externally beaded foot portion 76 that is deeply castellated by grooves at 78 whereby the resulting segments 77 can spring inwardly. A ferrule 80 having the same external dimension as the lower cylindrical portion 28 is journalled on the sleeve 74. In accomplishing this, a reduced upper portion 81 is received in the hollow 31 within the marginal skirt edges 79 thereof to prevent any wobbling and at the lower end an inward radial flange 82 journals on a cylindrical recess 83 above the beaded end 76 as weight supported on the turntable T. Assembly of the ferrule is had by collapsing the castellated bead segments 77 inwardly as flange 82 is pushed upwardly thereover after which the beaded segments recover to hold the ferrule in place.

After the upper and lower portions 26 and 28 are cemented together as an integrated unit, the push-off element 36 has its free ends squeezed together enough to clear the edges of the slot opening onto the shelf 44. They are then inserted in the slot opening and pushed deeper until the cams are reached whereupon the push-off element snaps inwardly into place.

The adapter is then ready for use as a unit and when installed the pawl 4 is manually pushed upwardly as the beaded end 76 is moved down over the top portion 9 until it engages the lever 20 whereupon the lever 20 is manually pushed inwardly and the bead end lowered further. In the meantime, the push-off element 36 moves outwardly to accommodate the upper end 9 of the small spindle and the larger spindle is free to be moved all the way down to the turntable. Removal is accomplished with a straight upward pull. Upon removal the incline 8 moves the push-off element out of interference and the pawl 4 is lifted upwardly to clear the removal of the lower portion 28.

The advantages of the foregoing invention are in the simplicity of the pusher mechanism having only one additional moving part which can be easily installed with very few tolerances, thereby reducing the expense of the adapter spindle by reducing the number of parts and the cost of assembly and providing an adapter spindle that can be used with the well-known and commonly used small spindle with the adapter spindle capable of being attached or removed easily and quickly.

What is claimed is:

1. For use with a phonograph having a rotatable turntable and an upstanding non-rotatable spindle of relatively small diameter coaxial therewith and having a shoulder on one side intermediate its ends to support a stack of records with small size center holes corresponding to the spindle size, means carried by said spindle for displacing the lowermost record from said shoulder when a stack of small hole size records is present on the spindle, an adapter receivable on said spindle for receiving and centering with respect to the turntable a stack of records having relatively large diameter center holes, said adapter comprising a body having two externally eccentric cylindrical portions defining a large center hole record supporting shoulder at the level of the first mentioned shoulder, a record push-off element slidably mounted intermediate said cylindrical portions for movement across said shoulders including resiliently supported leg portions disposed on opposite sides of the spindle and inclined to the direction of said movement, stationary cam wall elements on said body engaged by said leg portions urging retraction of said push-off element towards said non-rotatable spindle to rest above the first mentioned shoulder, said record displacing means carried by said spindle engaging said push-off element to move said push-off element from off the first mentioned shoulder across the second shoulder to displace the lowermost large center hole record that is supported on the second shoulder.

2. In a phonograph the combination of a rotatable turntable, an upstanding non-rotatable spindle of relatively small diameter size disposed coaxial therewith and having a shoulder on one side intermediate its ends for normally supporting a stack of records whose center holes are of corresponding spindle size, record push-off means carried by said spindle for displacing the lowermost record of said stack from said shoulder, an upwardly retractible pawl means above said shoulder on the opposite side of the spindle raised by said record push-off means and extending outwardly beyond the wall of the spindle for directing records into supported engagement with said shoulder, a removable adapter body receivable on said spindle for receiving and centering with respect to the turntable a stack of records having relatively large diameter center holes, said adapter comprising two vertically spaced externally eccentric cylindrical portions defining a second record supporting shoulder between them at the level of the first mentioned shoulder, the upper portion having a vertical opening having a keyhole cross-sectional shape receiving the spindle and said pawl means in non-rotative relationship throughout the length of said outwardly extending length of said pawl, a record push-off element slidably mounted in the upper cylindrical portion for radial movement across said shoulders above the lower cylindrical portions, means retracting said push-off element to a resting position above the first mentioned shoulder, said record push-off means carried by said spindle engaging said push-off element to move said push-off element from off the first mentioned shoulder across the second shoulder to displace any large center hole record supported on the record shoulder.

3. An adapter for playing records having a large center hole on a phonograph having a rotatable turntable and an upstanding non-rotatable spindle of relatively small diameter coaxial therewith with a radially actuated record push-off member, said adapter comprising a body having an opening therethrough receiving said spindle therein and including two externally eccentric cylindrical portions defining a record supporting shoulder between them above the turntable, an ellipsoidal spacer portion between said cylindrical portions having a cavity opening onto said shoulder, a record push-off element engaged by said push-off member and slidably mounted in said cavity for movement outwardly across said shoulder, said push-off element including a spring element coplanar with said push-off element having a portion horizontally inclined to the direction of movement of the push-off element, means urging retraction of said push-off element including a cam in said spacer portion cooperating with said spring element, and means carried by said spindle engaging said push-off member to move said push-off element across said shoulder.

4. For use with a phonograph having a rotatable turntable and an upstanding non-rotatable spindle of relatively small diameter coaxial therewith for receiving a stack of records with small size center holes corresponding to the spindle size, means carried by said spindle for supporting and dropping the records of said stack one by one to the turntable, an adapter receivable on said spindle for supporting and dropping one by one onto the turntable a stack of records having relatively large diameter center holes, said adapter comprising a body having two externally eccentric cylindrical portions defining a large center hole record supporting shoulder at the top of the lower one of said two portions, a record push-off element slidably mounted in said body for movement outwardly and reversely across the shoulder, said element comprising a W-shaped spring wire element whose outer legs have portions inclined to the direction of movement of the element, cam means engaging said inclined portions to deflect them during said outward movement for urging retraction of said push-off element, said record displacing means carried by said spindle engaging said push-off means to move said push-off element from off the first mentioned shoulder across the second shoulder to displace the lowermost large center hole record that is supported on the second shoulder.

5. For use with a phonograph having a rotatable turntable and an upstanding non-rotatable spindle of relatively small diameter coaxial therewith and having a shoulder on one side intermediate its ends to support a stack of records with small size center holes corresponding to the spindle size, means carried by said spindle for displacing the lowermost record from said shoulder when a stack of small hole size records is present on the spindle, an adapter receivable on said spindle for receiving and centering with respect to the turntable a stack of records having relatively large diameter center holes, said adapter comprising a body having two externally eccentric cylindrical portions defining a large center hole record supporting shoulder at the level of the first mentioned shoulder, a record push-off element slidably mounted intermediate said cylindrical portions for movement across said shoulders, means urging said push-off element towards said non-rotatable spindle to rest above the first mentioned push-off means to move said push-off element from off the first mentioned shoulder across the second shoulder to displace the lowermost large center hole record that is supported on the second shoulder, said push-off element engaging said first mentioned shoulder to limit downward movement of said adapter means interconnecting said spindle and body for supporting same non-rotatably with respect to each other, a ferrule portion, and means resiliently securing said ferrule rotatably with respect to said lower cylindrical portion of the body for engaging with free vertical movement and rotating with said turntable to hold large center hole records concentrically on the turntable including a radial flange element on one portion and radially resilient beaded elements telescoping therewith on the other portion.

References Cited

UNITED STATES PATENTS

| | | | |
|---|---|---|---|
| 2,761,687 | 9/1956 | Da Costa | 274—10 |
| 2,884,255 | 4/1959 | Wennerbo et al. | 274—10 |
| 3,191,943 | 6/1965 | Reed | 274—10 |

NORTON ANSHER, *Primary Examiner.*

J. F. PETERS, Jr., *Assistant Examiner.*